United States Patent [19]

Watanabe

[11] 4,226,382
[45] Oct. 7, 1980

[54] CATCHING AND HOLDING THE TERMINAL END OF A TAPE IN A TAPE REEL

[75] Inventor: Koji Watanabe, Niiza, Japan
[73] Assignee: Nifco Inc., Yokohama, Japan
[21] Appl. No.: 65,819
[22] Filed: Aug. 13, 1979
[30] Foreign Application Priority Data Aug., 1978 [JP] Japan .................................. 53/109438

[51] Int. Cl.³ ............................................ B65H 75/28
[52] U.S. Cl. .................................................... 242/74
[58] Field of Search ....................... 242/74, 74.1, 74.2, 242/68.3, 197, 198, 199

[56] References Cited
U.S. PATENT DOCUMENTS

| | | | |
|---|---|---|---|
| 1,902,826 | 3/1933 | Bobo | 242/74 X |
| 2,191,489 | 2/1940 | McQuiston | 242/74 |
| 3,944,155 | 3/1976 | Wilczewski | 242/74 |

FOREIGN PATENT DOCUMENTS 546349 3/1932 Fed. Rep. of Germany .............. 242/74

*Primary Examiner*—Edward J. McCarthy
*Attorney, Agent, or Firm*—J. R. Halvorsen; T. W. Buckman

[57] ABSTRACT

A slot for receiving the terminal end of tape is formed in the circumference of the hub of a tape reel. The slot is defined by a stationary side wall and a cantilevered side wall. There is a vacant space behind the cantilevered wall, and by pushing and driving a wedge into the vacant space, the cantilevered wall is pushed against the stationary wall to catch and hold the terminal end of the tape.

7 Claims, 8 Drawing Figures

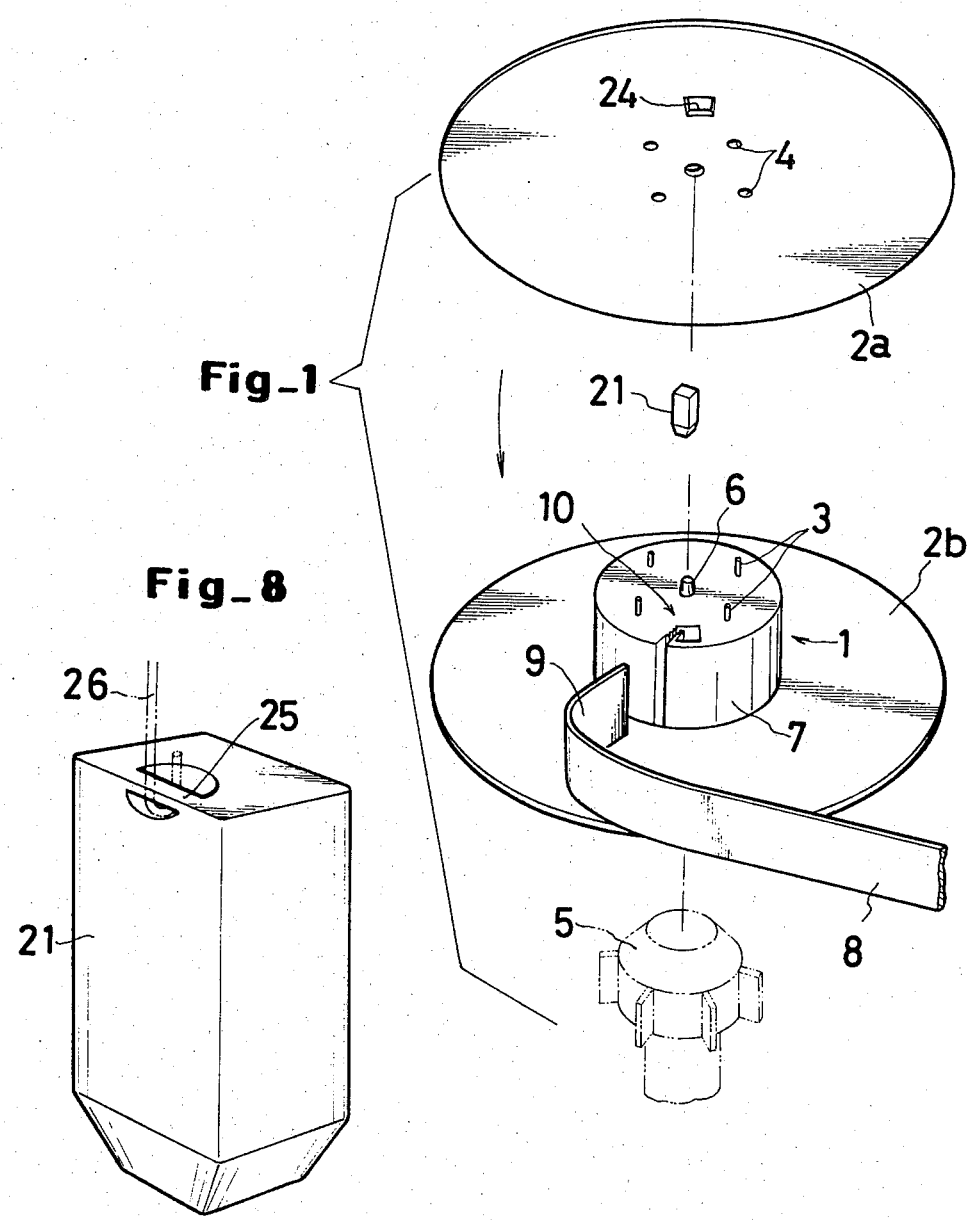

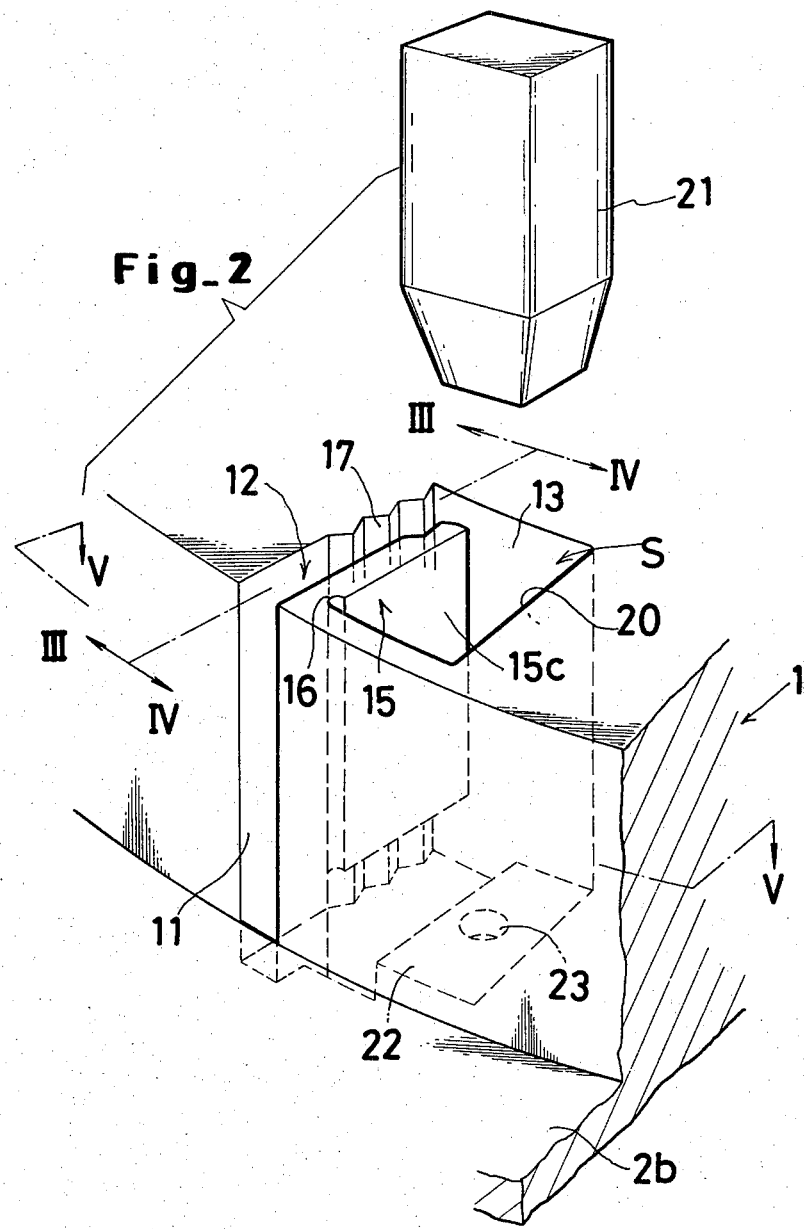

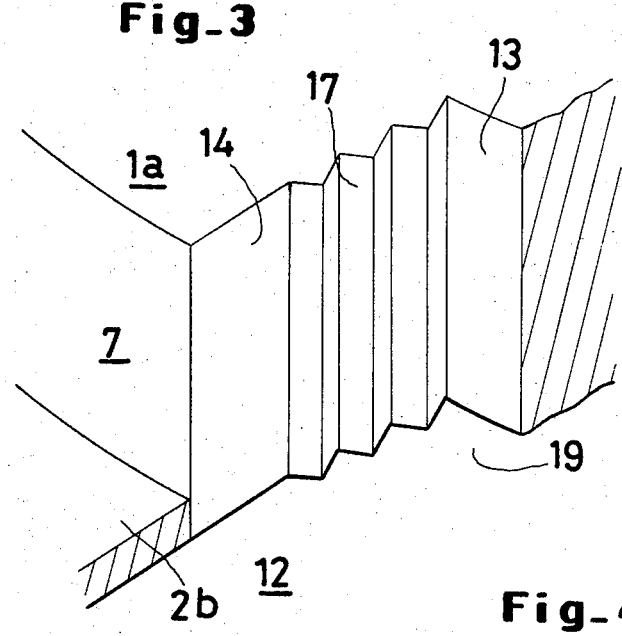
Fig_3
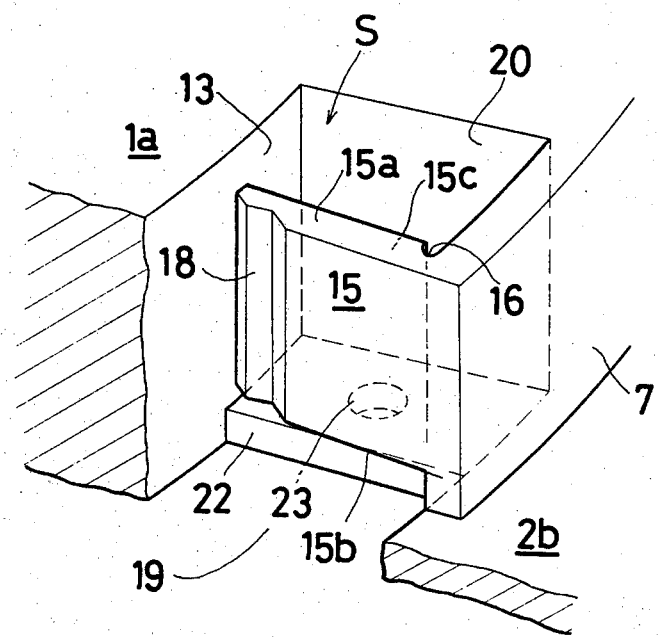
Fig_4

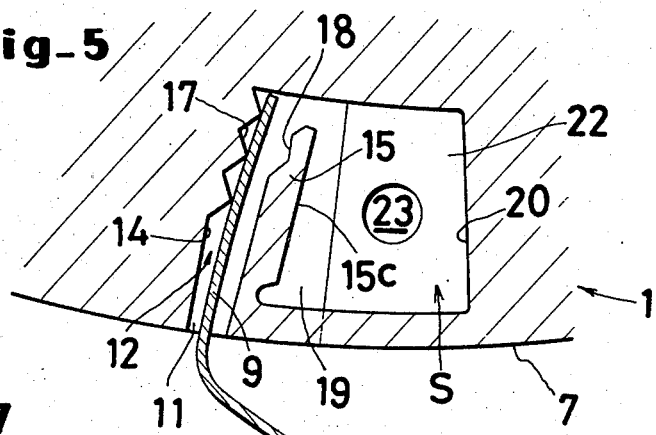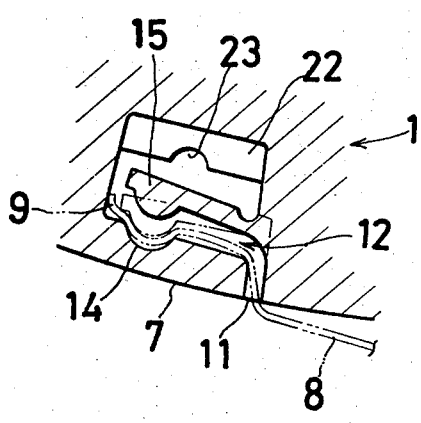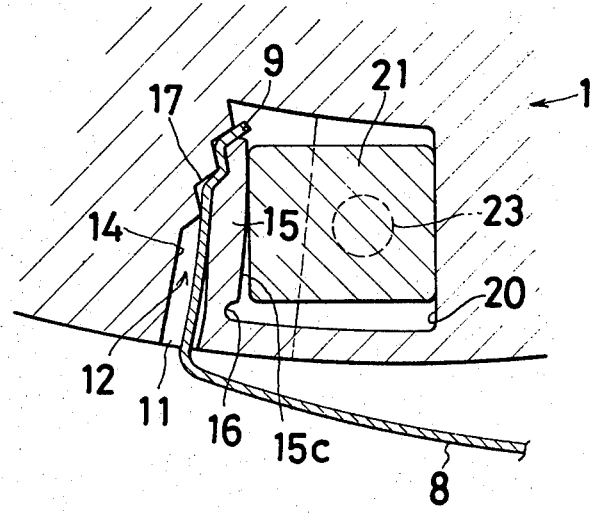

CATCHING AND HOLDING THE TERMINAL END OF A TAPE IN A TAPE REEL

BACKGROUND OF THE INVENTION

This invention relates to a video or audio recording tape reel having means for holding the terminal end of the tape.

Hitherto a variety of holding means have been proposed, but all of these have certain defects in common. Specifically, in almost all the known holding means there is provided a relatively large recess in the hub around which a length of tape is to be wound. The terminal end of the tape is put in the recess, and then a push insert is put in the recess, pushing the terminal end of the tape against the inner wall of the recess as, for instance, under a resilient force.

The push insert is often put in the recess in the radial direction of the hub. Otherwise, it is slipped in the recess in the axial direction of the hub. In either type of pushing-and-catching means a part of the push insert appears above the circumference of the hub.

The standards regarding the permissible degree of deviation from exact circularity in the hubs of reels is being made increasingly severe with a view to preventing wow originating in the rotating reel and at the same time preventing the deformation of the roll of the tape wound around the hub. With the conventional arrangements mentioned above, the push insert cannot be put in the recess to be flush with the circumference of the hub, and this inevitably reduces precision in circularity.

In catching the terminal end of the tape in the hub, a pushing force is applied directly to the push insert, and the push insert is kept directly in contact with the terminal end of the tape.

Therefore, the terminal end of the tape is subjected to undesired pushing-and-scraping force, often damaging the tape so much as to impair its commercial value. Moreover, the work of holding the terminal end of the tape onto the hub requires much care and accordingly lowers the efficiency of fabrication.

One object of this invention is to provide means for holding the terminal end of the tape on the hub of a reel in which means: minor modification is required only at a limited portion of the circumference of the hub; the push insert does not appear above the circumference of the hub; and the part which is subjected to pushing force from the exterior is separate from the part which is brought in contact with the terminal end of the tape, thus assuring that no undesired force other than the holding force is applied to the terminal end of the tape.

Another object of this invention is to provide a tape end holding means from which the terminal end of the tape can be easily released when desired.

SUMMARY OF THE INVENTION

To attain these objects, the means for holding the terminal end of the tape according to this invention comprises a slot-and-hole, the slot of which opens on the circumference of the hub of the reel and extends to the interior of the hub, thereby providing a very narrow space in which the terminal end of the tape is snugly accommodated. One of the two walls defining the slot is stationary and the other is in the form of a cantilever behind which a hole (vacant space) is defined. A wedge is adapted for insertion in the hole behind the cantilever wall so as to push it against the stationary wall.

In one conventional holding means for use in a reel having a recessed hub and two opposite disk flanges, it is possible to obtain access to the recess of the hub for the purpose of inserting or removing a push insert into or from the hub only through the relatively narrow space between the disks. With a view to reducing the difficulty which is encountered in attaching and removing the terminal end of the tape to and from the hub of the reel, it has been proposed to make at least one of the disk flanges detachable from the hub of the reel. This, however, greatly increases the structural complexity of the reel.

In a holding means according to the present invention, the terminal end of the tape is inserted to the full depth of the slot and then a wedge is pushed into the hole of the hub to positively catch the terminal end of the tape. The terminal end of the tape can be released from the hub simply by pulling the wedge out of the hole of the hub. Also advantageously, the terminal end of the tape never makes contact with the wedge so that the tape is not damaged and the production efficiency is accordingly improved.

Other objects and advantages of this invention will be better understood from the following description which is made with reference to the drawings:

FIG. 1 is an exploded perspective view showing a tape reel to which a holding means according to this invention is applied;

FIG. 2 is an enlarged perspective view showing a holding means according to this invention;

FIG. 3 is a perspective sectional view of a part of the holding means taken along line III—III in FIG. 2;

FIG. 4 is a perspective sectional view of another part of the holding means taken along line IV—IV in FIG. 2;

FIG. 5 is a sectional view taken along line V—V in FIG. 2;

FIG. 6 is a sectional view showing the manner in which the terminal end of the tape is caught and positively held;

FIG. 7 is a sectional view showing a second embodiment according to this invention in the state of holding the terminal end of the tape; and FIG. 8 is a perspective view showing the structure of another wedge.

DESCRIPTION OF PREFERRED EMBODIMENTS

The drawings show a video recording tape reel to be fitted in a cassette and parts which have no close connection to the tape end holding means according to this invention are omitted or are shown only diagramatically. The tape reel is made of a synthetic resin of a type proper for the purpose.

Referring to FIG. 1, two disk flanges 2a and 2b are fixed to the opposite faces of a hub 1. One of the disks 2b is integrally connected to the hub 1 and the other disk 2a is separate therefrom. The disk 2a is placed on the face of the hub so as to allow the stud pins 3 to fit in the apertures 4 of the disk 2a and then the disk 2a is fixed to the hub as by supersonic welding.

The tape end holding means according to this invention is not limited in application to the particular kind of tape reel shown and can be equally well applied to tape reels using other modes of attachment between the disks and the hub. A blind hole (not shown) is formed inward from one face of the hub accommodating the winding spindle 5 (broken line) and a small projection 6 is provided on the other face of the hub rising above the disk flange 2a for engaging with a reel holding tab (not shown) in the cassette. As a matter of course different hub structures may be selected and used, depending upon the kind of tape transport mechanism to be used.

Referring to FIG. 2, there is shown in an enlarged scale, means for catching and holding the terminal end 9 of the tape 8 which is wound around the circumference 7 of the hub 1. As is well known, the terminal end portion of the tape may be part of the recording tape or may be a lead extension from the end of the recording tape.

The tape end catching-and-holding means 10 has a slot 12 with a slot opening 11 extending in the axial direction of the hub at its circumferential edge. The slot 12 extends radially into the hub body as far as a wall 13.

The slot 12 is defined by two opposing side walls 14 and 15. Side wall 14 is stationary whereas the other side wall 15 is built in the circumferential edge of the hub in the form of a cantilever. As shown, the side wall 15 is integrally connected to the circumferential edge of the hub through the hinge portion 16 (which portion is made thinner than the remaining portion of the cantilever) and a vacant space is formed behind the cantilevered wall 15. Thus, the cantilevered wall 15 yieldingly bends when a pushing force is applied thereto and, because of the resiliency inherent to the synthetic resin from which it is made, returns to its original position when the pushing force is released. In the original position the cantilevered side wall 15 together with the stationary side wall 14 defines a slot of constant width over a certain radial depth.

These side walls 14 and 15 are best shown in section in FIGS. 3 and 4. In this particular embodiment, a number of notches 17 (ridges and grooves) are formed on the stationary side wall 14 and a single complementary notch 18 is formed on the cantilevered side wall 15 in such a position that the groove of the notch 18 is brought in close contact with an associated ridge of the notches 17 when the cantilevered wall is pushed against the stationary wall.

The vacant space S behind the cantilever permits the pivotal movement of the cantilever about the hinge portion 16 thereof. The vacant space S is better described hereinafter.

As shown, the slot-and-hole is defined by the opposite side walls 14 and 15, the wall 13, the wall 20 and the wall formed by the peripheral region of the hub. The top surface 15a of the cantilevered wall 15 lies at a level which is somewhat lower than the top surface 1a of the hub 1, and the bottom surface 15b of the cantilevered wall 15 lies at a level which is higher than the bottom surface of the hub 1. The bottom extension 15b of the cantilever lies in the "cut-in space" 19 of the bottom of the hub. This is required for molding and is not related to function or design. The hole space "S" is defined by the back surface 15c of the cantilevered wall 15 and the wall 20. This vacant space "S" is opened at least at one end thereof for the purpose described below.

In catching and holding the terminal end of the tape length, a wedge which is somewhat wider than the width of the hole space (i.e., the circumferential distance between the surface 15c of the cantilever and the wall 20) is inserted in the vacant space S from the open side thereof and is driven inward. The work of catching and holding the terminal end of the tape length is described below with reference to FIGS. 5 and 6.

Referring to FIG. 5 the terminal end 9 of the tape is inserted from the slot opening 11, and is laid between the opposite walls 14 and 15, particularly between the notched portions of the walls 14 and 15. Then, a wedge 21 in the form of a tapering square rod as seen in FIGS. 1 and 2, is pushed into the vacant space "S" with the finger or a tool appropriate for the purpose.

As the tapering wedge is driven into the vacant space, the cantilevered wall 15 is yieldingly bent towards the stationary wall 14 until the cantilevered wall 15 has been pushed against the stationary wall 14, thereby catching and holding the terminal end 9 of the tape 8. Thanks to the notched portions of the the opposite side walls, the portions of these walls which participate in effectively catching the terminal length of the tape are longer than would otherwise be the case. Thus, the tape end is positively caught and held against any pulling force in the direction action to remove the tape end from the hub. Non-notched (or flat surfaced) walls may also be used and will apply a catching and holding force strong enough to prevent the terminal end of the tape from slipping off from the hub under conditions of orginary use. In this case it is necessary to use a wedge which is wide enough to generate a sufficient catching and holding force in the vacant space. The cross-section of a wedge may be square, circular or of any other geometric shape, which is able to give a strong push to the cantilever wall 15 against the stationary wall 14. The wedge is preferably shorter than the axial length of the hub because otherwise the wedge will project from the vacant space.

As is readily understood from the above, the part of the tape end holding means to which a force is applied directly is not brought into contact with the terminal end of the tape. The holding force is transmitted through the cantilever wall and is applied as a static force. Therefore, there is no danger of the tape being damaged by an undesired force acting thereon. The terminal end of the tape can be positively held in a reliable way simply by pushing the wedge in the vacant space "S" of the hub, and therefore, the efficiency of the fabrication work can be improved.

In applying the tape end holding means according to this invention to a tape reel, the only modification in the circumference of the hub which is required is the provision of a slot opening 11 wide enough to permit entry of the tape, and therefore, the slot opening accounts for only a minute fraction of the total circumference of the hub so that there is little or no fear of deforming the roll of tape around the hub. As a consequence, the reel provided with the tape end holding means according to this invention fully meets the strict standards for reel circularity. In a conventional tape end holding means using a push insert, the push insert spans a relatively large angular extension on the circumference of the hub. This is a cause for irregular winding of the tape and the wow of the rotating reel. In an irregularly would roll, the tape is partly stretched and distorted.

In addition to the basic structure mentioned above, it is preferable to include the following items in the structure of the tape end holding means according to this invention.

First, with a view to preventing the wedge from passing beyond the disk flange of the reel, the vacant space "S" is best provided with a bottom 22.

Second, with a view to facilitating the release of the terminal end of the tape from the hub of the reel, an opening 23 is best made in the bottom 22, thereby allowing the wedge 21 to be pushed out of the hole in the opposite direction to that in which the wedge was pushed into the hole. A pin or any other tool which is appropriate for the purpose can be used to push the wedge out of the hole.

An aperture 24 (FIG. 1) is best made in the disk 2a to allow the wedge 21 to pass therethrough when releasing the terminal end of the tape. Also, the aperture 24 can be used as an entrance to the hole space S when the wedge is pushed into the hole space to catch and hold the terminal end of the tape.

The terminal end of the tape can be attached to the hub before or after the disk flange 2a is integrally connected to the hub. This increases the degree of freedom in programming the assembling steps.

In the embodiment described so far, the slot 12 is cut straight (exactly radially inward) from the slot opening 11 on the circumference of the hub. The slot 12, however, can be curved as shown in FIG. 7, and in place of the notched portions, the stationary and cantilevered walls may have semi-circular male and female portions. In this embodiment, the opening 23 for pushing the wedge out of the hole space is made by notching the side of the bottom.

In FIG. 7 the cantilevered wall is fixed to the hub body through the hinge portion in the vicinity of the slot opening 11. The cantilevered wall, however, can be fixed to the opposite side of the hole remote from the slot opening 11.

The tape end holding means has been described as applying to a reel having side flanges 2a and 2b. As a matter of course, the tape end holding means according to this invention can be equally well applied to a flangeless reel, such as an ordinary audio cassette tape reel. In this case it suffices that an aperture 23 be made in the bottom of the hub for pushing the wedge out of the hole space. Otherwise, a bridge 25 is formed on one side of the top of the square wedge 21. In withdrawing the wedge a hook 26 is used to catch the bridge 25 of the wedge 21 and the hook 26 is raised.

As is apparent from the above, the means for catching and holding the terminal end of the tape length according to this invention comprises a first part (wedge) to which a force is directly applied and a second part (cantilevered wall) which functions to catch and hold the terminal end of the tape, and the first and second parts are separate from each other. This protects the tape from damage and at the same time assures easy and efficient work in fabrication. Also, the circumference of the hub has only a very small slot opening, causing neither irregular winding nor wow of the rotating reel, and making it possible to meet the severe tolerance standards which must be met in the manufacture of tape reels. Still advantageously, the tape end holding means allows easy release of the terminal end of the tape when desired.

What is claimed is:

1. A means for catching and holding the terminal end of a tape in a tape reel comprising:
    a slot which opens on the circumference of the hub of the tape reel and extends into the hub body, said slot being defined by a stationary side wall and a cantilevered side wall;
    a vacant space behind the cantilevered wall;
    a wedge for insertion into the vacant space;
    whereby the terminal end of the tape is caught and held between the cantilevered wall and the stationary wall when the wedge is driven into the vacant space to push the cantilevered wall against the stationary wall.

2. A means for catching and holding the terminal end of a tape according to claim 1 wherein the cantilevered wall is pivotally and integrally connected to a part of the hub in the vicinity of the slot opening.

3. A tape end catching-and-holding means according to claim 1 wherein said slot extends straight from the opening in the radial direction of the hub.

4. A tape end catching-and-holding means according to claim 1 wherein said slot first extends straight in the radial direction of the hub and then curves to run parallel to the circumference of the hub.

5. A tape end catching-and-holding means according to claim 1 wherein the vacant space is at least partially closed at the bottom.

6. A tape end catching-and-holding means according to claim 1 wherein said closed bottom includes aperture means adapted to accept means for removing said wedge from said vacant space to release said tape.

7. A tape end catching-and-holding means according to claim 1 wherein said wedge includes means for accepting a tool to permit removal of said wedge from said vacant space to release said tape.

* * * * *